US006913364B2

(12) United States Patent
Kane

(10) Patent No.: US 6,913,364 B2
(45) Date of Patent: Jul. 5, 2005

(54) PANEL ATTACHMENT SYSTEM

(75) Inventor: Michael T. Kane, Fairport, NY (US)

(73) Assignee: Blue Ridge International Products Company, Freeport, FL (US)

( * ) Notice: Subject to any disclaimer, the term of this patent is extended or adjusted under 35 U.S.C. 154(b) by 0 days.

(21) Appl. No.: 10/802,297

(22) Filed: Mar. 16, 2004

(65) Prior Publication Data

US 2004/0179282 A1 Sep. 16, 2004

Related U.S. Application Data

(62) Division of application No. 10/226,566, filed on Aug. 23, 2002, now Pat. No. 6,857,753.
(60) Provisional application No. 60/314,723, filed on Aug. 24, 2001.

(51) Int. Cl.⁷ .............................................. G02B 7/182
(52) U.S. Cl. ...................... 359/879; 359/872; 359/878
(58) Field of Search .......................... 359/879, 871–878, 359/838, 857–860; 248/490, 497, 476–481; 368/10, 45, 97–99; 340/326, 555–556

(56) References Cited

U.S. PATENT DOCUMENTS

| | | |
|---|---|---|
| 4,383,626 A | 5/1983 | Weinblatt |
| 4,623,177 A | 11/1986 | McKinney |
| 4,681,368 A | 7/1987 | Heath et al. |
| 4,702,572 A | 10/1987 | Cossey |
| 4,712,892 A | 12/1987 | Masucci |
| 4,733,956 A | 3/1988 | Erickson |
| 4,902,118 A | 2/1990 | Harris |
| 4,909,618 A | 3/1990 | Gardner |
| 5,103,347 A | 4/1992 | Lumbra et al. |
| 5,285,321 A | 2/1994 | Nolan-Brown |
| 5,576,898 A | 11/1996 | Rubin |
| 6,006,462 A | 12/1999 | Lackomar |
| 6,030,085 A | 2/2000 | Leam et al. |
| 6,039,455 A | 3/2000 | Sorenson |
| 6,120,155 A | 9/2000 | Brennan et al. |
| 6,283,622 B1 | 9/2001 | Chupp et al. |
| 6,305,810 B1 | 10/2001 | Mercado |
| 6,354,708 B1 | 3/2002 | Monahan et al. |
| 6,554,357 B2 | 4/2003 | Moffa |
| 6,619,605 B2 | 9/2003 | Lambert |
| 2001/0008266 A1 | 7/2001 | Lambert |
| 2003/0039041 A1 | 2/2003 | Darling et al. |

FOREIGN PATENT DOCUMENTS

WO  WO 03/018362  3/2003

OTHER PUBLICATIONS

International Search Report mailed Nov. 20, 2002 in application PCT/US 02/26722 corresponding to U.S. Appl. No. 10/226,566.

Baby–in–Sight™ product packaging (one sheet), and two photos of product in use. Blue Ridge International Products Company. (Mar. 2000).

(Continued)

Primary Examiner—Mohammad Sikder
(74) Attorney, Agent, or Firm—Carter Schnedler & Monteith, P.A.

(57) ABSTRACT

A viewing panel device, such as a mirror device used inside a motor vehicle for observing an infant in a rear-facing child safety seat secured to the rear seat of the vehicle. In one embodiment, a support structure is attached to a rear surface of the viewing panel. In a more particular embodiment, the support structure includes a bottom panel having a top surface and a bottom surface that can contact the seat back top surface, and a diagonal support element that extends between the rear surface of the viewing panel at an upper end of the support element and the top surface of the bottom panel at a lower end of the support element. In another embodiment, the viewing panel device may be employed in a plurality of attachment configurations, for use with a plurality of possible vehicle configurations. In one configuration, the top tether anchorage point included in newer vehicles as part of the LATCH anchorage point system is employed.

22 Claims, 6 Drawing Sheets

OTHER PUBLICATIONS

"Bear View" product hang tag (two sheets when copied).

"Bear View™ Infant Mirror." From website www.bearview.net. Downloaded May 8, 2003.

Redacted letter Jun. 3, 2003 (pp. 1 and 3 only) from Bruce H. Johnsonbaugh, of Eckhoff & Hoppe, attorneys for See Me Smile Products, Inc. regarding hangtag for "BearView" mirror attachment, with Exhibits A, B and C.

NHTSA web page "Top Anchorage System" http://www.nhtsa:dot.gov/people/injury/childps/toptether/index.html (downloaded from internet Aug. 16, 2002; effective date unknown).

NHTSA web page "LATCH: Lower Anchors and Tethers for Children" http://www.nhtsa.dot.gov/people/injury/childps/csr2001/csrhtml/LATCH.html (downloaded from internet Jul. 26, 2002; effective date unknown).

NHTSA web page "Types of Child Safety Seats" http://www.nhtsa.dot.gov/people/injury/childps/safetycheck/TypeSeats/index.htm (downloaded from internet Aug. 18, 2002; effective date unknown).

Car–Safety.org web page "LATCH and Top Tether Information for Child Restraints" http://user.mc.net/~carseat/latch.html (downloaded from internet Jul. 26, 2002; effective date unknown).

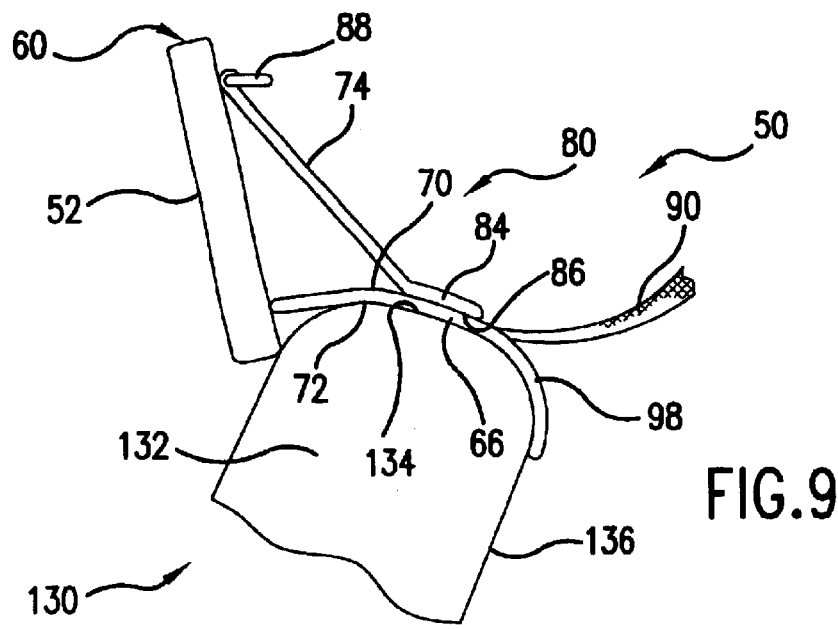
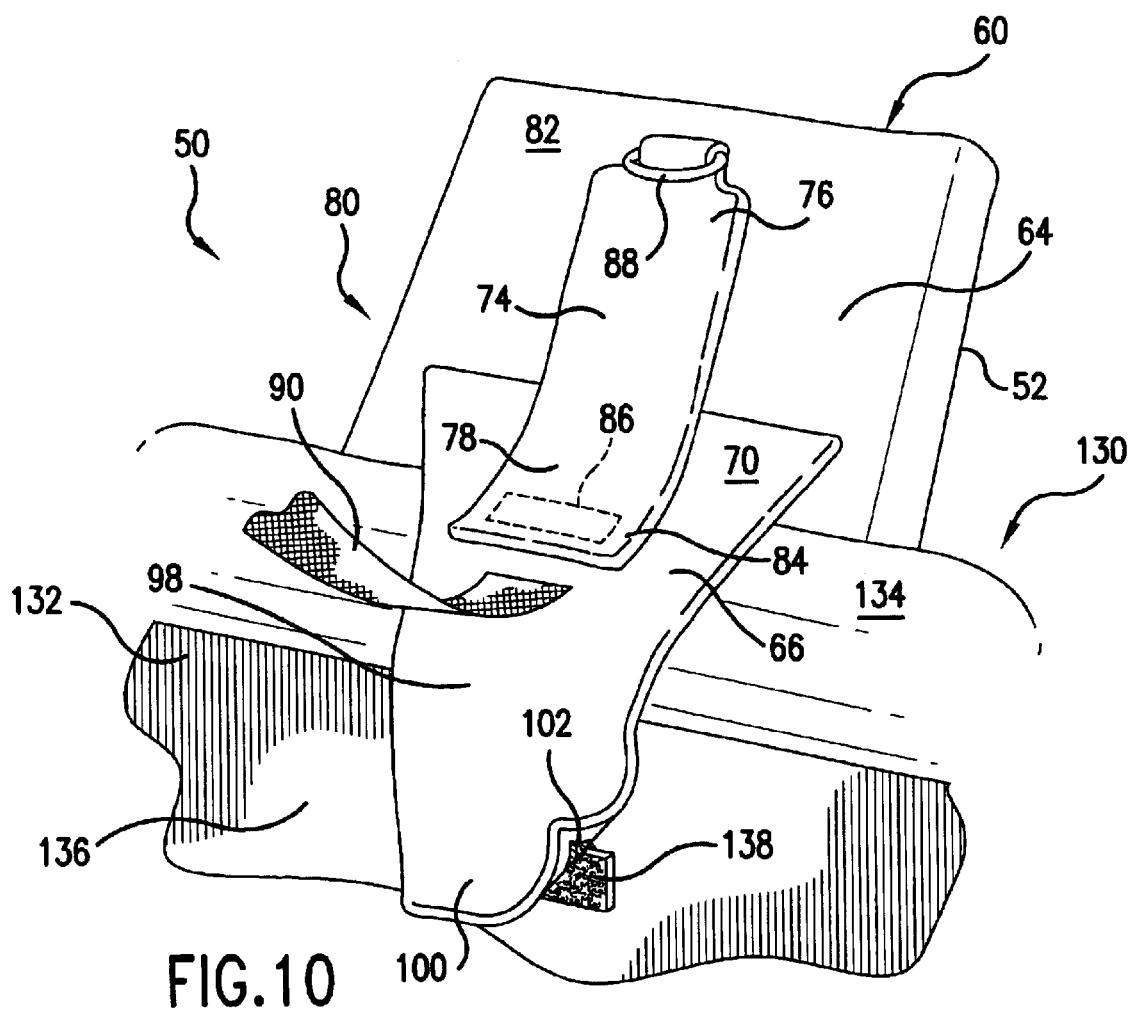

PANEL ATTACHMENT SYSTEM

CROSS-REFERENCE TO RELATED APPLICATION

This is a division of U.S. patent application Ser. No. 10/226,566, filed Aug. 23, 2002 now U.S. Pat. No. 6,857, 753, which in turn claims the benefit of U.S. Provisional Patent Application Ser. No. 60/314,723, filed Aug. 24, 2001.

BACKGROUND OF THE INVENTION

The invention relates to attachment systems for panels attached to seats of vehicles, such as but not limited to mirrors used inside a motor vehicle for observing an infant in a rear-facing child safety seat secured to the rear seat of the vehicle.

Mirror devices used inside a motor vehicle for observing an infant in a rear-facing child safety seat secured to the rear seat of the vehicle are disclosed, for example, in the following U.S. patents: Cossey U.S. Pat. No. 4,702,572; Masucci U.S. Pat. No. 4,712,892; Erickson U.S. Pat. No. 4,733,956; Harris U.S. Pat. No. 4,902,118; Gardner U.S. Pat. No. 4,909,618; Lumbra et al U.S. Pat. No. 5,103,347; Nolan-Brown U.S. Pat. No. 5,285,321; Rubin U.S. Pat. No. 5,576,898; Sorenson U.S. Pat. No. 6,039,455; Brennan et al U.S. Pat. No. 6,120,155; Mercado U.S. Pat. No. 6,305,810 and Monahan et al U.S. Pat. No. 6,354,708.

Very briefly, in such devices, a mirror is mounted near the top of the rear seat of a motor vehicle in such a way that the driver of the vehicle, by looking in the conventional rear view mirror, can observe in the mirror mounted near the top of the rear seat an infant in a child safety seat of the type in which the infant is positioned facing the rear of the vehicle. A variety of attachment methods for such mirror devices have been proposed and employed.

SUMMARY OF THE INVENTION

In one aspect, the invention is embodied in a viewing panel device for use in a vehicle including a relatively rearwardly-positioned vehicle seat with a seat back having a top surface. The device includes a viewing panel having a front viewing surface and a rear surface, and a support structure attached to the rear surface of the viewing panel. The support structure in turn includes a bottom panel having a top surface and a bottom surface that can contact the seat back top surface, and a diagonal support element that extends between said rear surface of said viewing panel at an upper end of said support element and said top surface of said bottom panel at a lower end of said support element.

In another aspect, the invention is embodied in a viewing panel device having a plurality of attachment configurations for use in vehicles including a relatively rearwardly-positioned vehicle seat with a seat back having a top surface, and of a plurality of possible vehicle configurations including in vehicles having a top tether anchorage point intended for attachment of the top tether of a forward-facing child safety seat, and in vehicles having a headrest positioned over the vehicle seat back. The device includes a viewing panel having a front viewing surface and a rear surface. A bottom panel is attached to a relatively lower portion of the viewing panel rear surface. The bottom panel has a top surface and a bottom surface that can contact the seat back top surface. An element of a fastener is attached to a relatively upper portion of the viewing panel. A diagonal support element can extend between the rear surface of the viewing panel and the bottom panel top surface, and is removably attachable at one end. A tether strap extends from the bottom panel and terminates in a fastener that can be attached either to the top tether anchorage point in a vehicle so configured, or to the fastener element when the tether strap is looped around the headrest in a vehicle so configured.

In another aspect, the invention is embodied in a viewing panel device for use in a vehicle including a relatively rearwardly-positioned vehicle seat with a seat back having a top surface, and including a top tether anchorage point intended for attachment of the top tether of a forward-facing child safety seat. The device includes a viewing panel having a front viewing surface and a rear surface. A support structure is attached to the viewing panel generally on the rear surface thereof. The support structure includes a portion that contacts the seat back top surface. A tether strap extends from the support structure and terminates in a fastener that attaches to the top tether anchorage point.

In yet another aspect, the invention is embodied in a viewing panel device for use in a vehicle including a vehicle seat with a seat back and a headrest positioned thereover. The device includes a viewing panel having a front viewing surface and a rear surface. A bottom panel is attached to a generally lower portion of the rear surface of the viewing panel. An element of a fastener is connected to a generally upper portion of the viewing panel. A tether strap extends from the bottom panel and has a free end that is attachable to the fastener element when the tether strap is looped around the headrest to enable the viewing panel device to be secured to the headrest.

In still another aspect, the invention is embodied in a viewing panel device for use in a vehicle including a rear vehicle seat with a seat back having a top surface, and a rear shelf behind the seat back. The device includes a viewing panel having a front viewing surface and a rear surface. A support structure is attached to the rear surface of the viewing panel. The support structure includes a portion that contacts the seat back top surface. A tail extends from the support structure and can be tucked in between the vehicle seat back and the rear shelf for frictional engagement.

In another aspect, the invention is embodied in a viewing panel device for use in a vehicle including a relatively rearwardly-positioned vehicle seat with a seat back having a top surface and a rear surface. The device includes a viewing panel having a front viewing surface and a rear surface. A support structure is attached to the rear surface of the viewing panel. The support structure includes a portion that contacts the seat back top surface, and has an extending tail. The extending tail has an element of a fastener on the underside thereof for removably fastening to the vehicle seat rear surface.

BRIEF DESCRIPTION OF THE DRAWINGS

FIG. 9 is a side elevational view of the mirror device of FIG. 2 employed in a fourth attachment configuration, referred to herein as a "Fastener Attachment" configuration; and FIG. 10 is a three-dimensional view, generally from the rear, of the mirror device employed in the "Fastener Attachment" configuration of FIG. 9.

DETAILED DESCRIPTION

Figure 1:
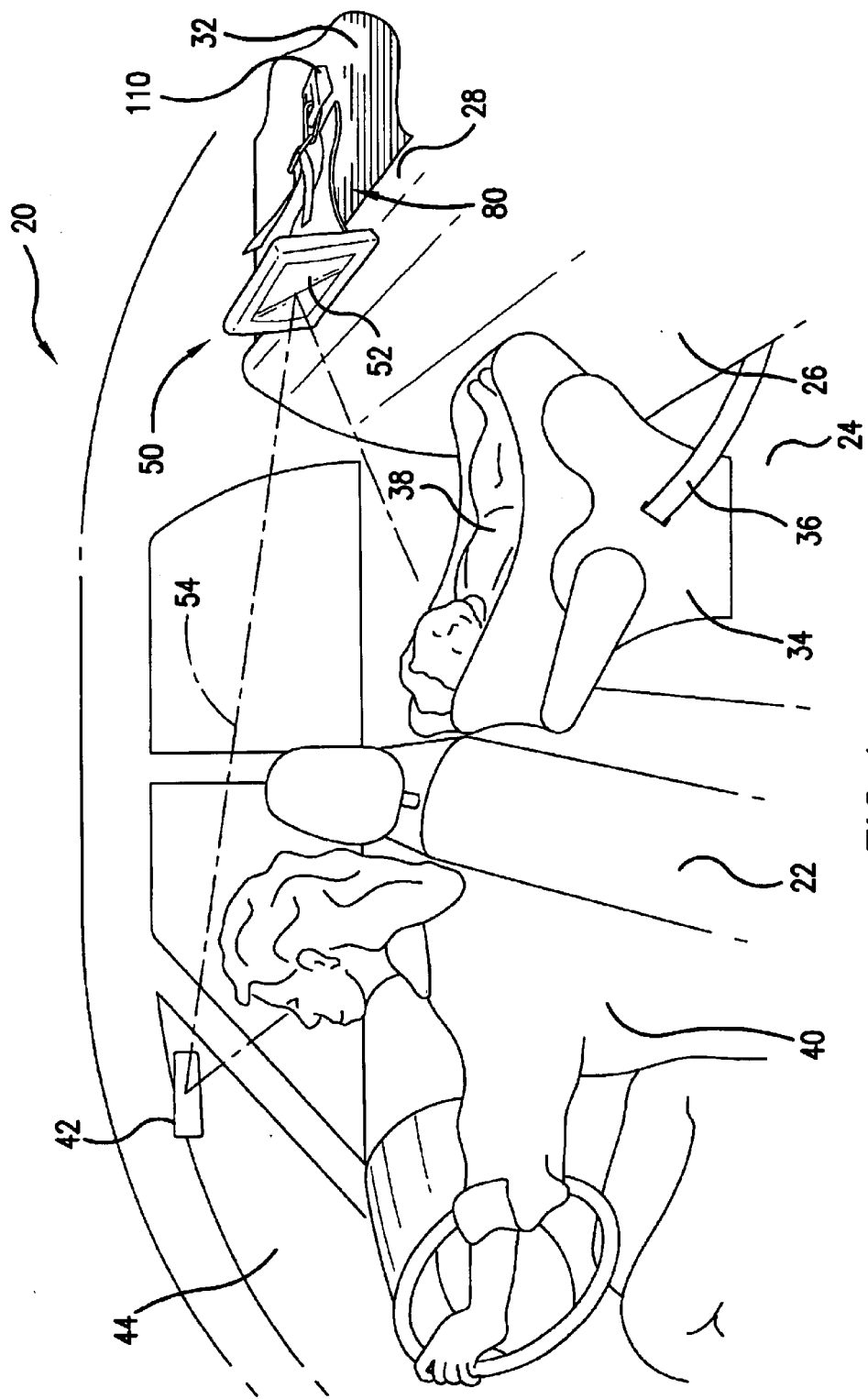
FIG. 1 is a diagrammatic illustration of a vehicle including a mirror device for observing an infant in a rear-facing child safety seat secured to the rear seat of the vehicle.

Referring first to FIG. 1, represented is a vehicle 20 in the form of an automobile 20 including a front vehicle seat 22 and a rearwardly-positioned vehicle seat 24. In FIG. 1 the seat 24 is the rear vehicle seat, since there are only front and rear seats and no intermediate seats in the particular vehicle 20 of FIG. 1.

The rear vehicle seat 24 has a seat back 26 with a top surface 28. Behind the seat back 26, and extending up to a rear window (not shown), is a rear shelf 32, which also may be referred to as a rear filler panel 32.

On and secured to the rear vehicle seat 24 is a rear-facing child safety seat 34 secured by a seatbelt assembly 36 in conventional manner. An infant 38 is seated in the child safety seat 34.

In the front vehicle seat 24 is a driver 40, who may wish to observe the infant 38. A conventional rear view mirror 42 is attached to the vehicle front windshield 44, but this rear view mirror 42 alone is not sufficient for observing the infant 38, since the infant 38 is facing the rear.

Accordingly, and as noted hereinabove, a variety of mirror devices have been proposed, generally in the form of a mirror mounted in some manner near the top of the rear seat 24 in such a way that the driver 40 can observe the infant 38 by looking in the rear view mirror 42.

A mirror device of this general type and embodying the invention is designated 50. In FIG. 1, the mirror device 50 is shown by way of example in one of its several possible attachment configurations, in particular the "Tether Attachment" configuration described hereinbelow in detail with reference to FIGS. 3 and 4. The mirror device 50 includes a reflective front surface 52 comprising a non-glass (for safety reasons) mirror 52. As indicated by an optical axis 54, the mirror device 50 enables observation of the infant 38 in the rear-facing child safety seat 34.

Figure 2:
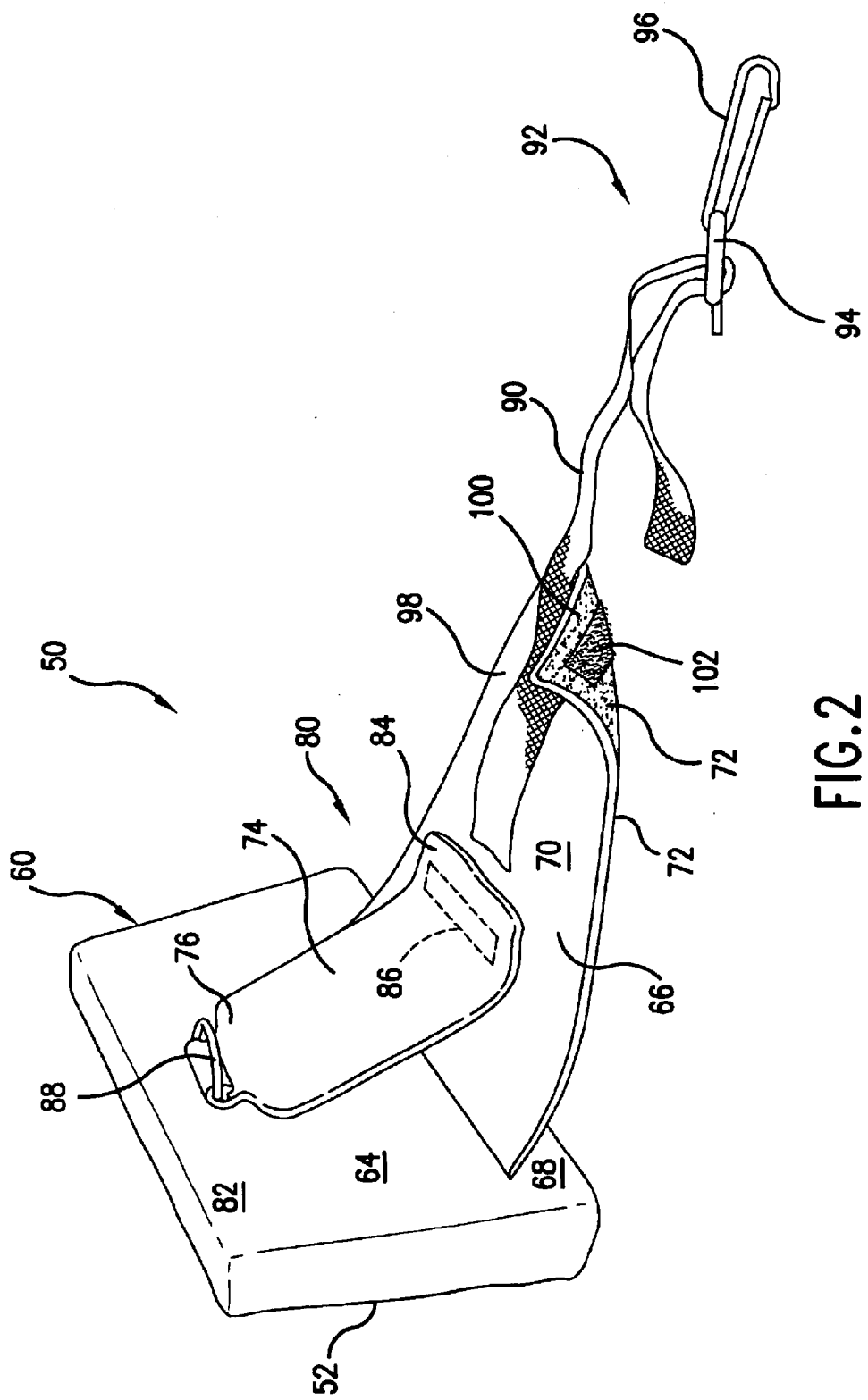
FIG. 2 is a three-dimensional view of a viewing panel device embodying the invention in the exemplary form of a mirror device, for use with a plurality of possible vehicle configurations, and correspondingly capable of being employed in several attachment configurations.

FIG. 2 shows the mirror device 50 embodying the invention in isolation and in greater detail. Although the device 50 is shown in FIG. 1 as a mirror device positionable for viewing the infant 38 in the rear-facing child safety seat 34, such is representative of a viewing panel device 50 in general, which may or may not include a mirror. For example, a viewing panel device 50 embodying the invention may include ornamentation, fixed, removable, or both, for entertaining the infant 38. Or the viewing panel device 50 may comprise an educational activity panel.

Figure 3:
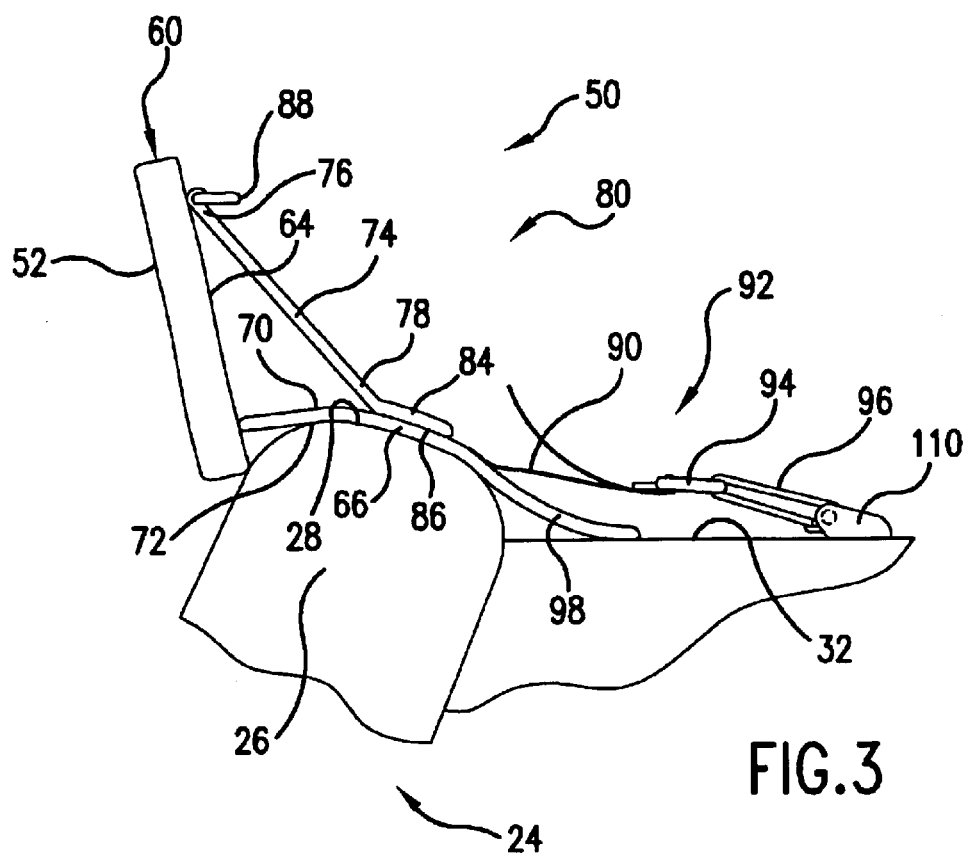
FIG. 3 is a side elevational view depicting the mirror device of FIG. 2 employed in a first attachment configuration, referred to herein as a "Tether Attachment" configuration.
Figure 4:
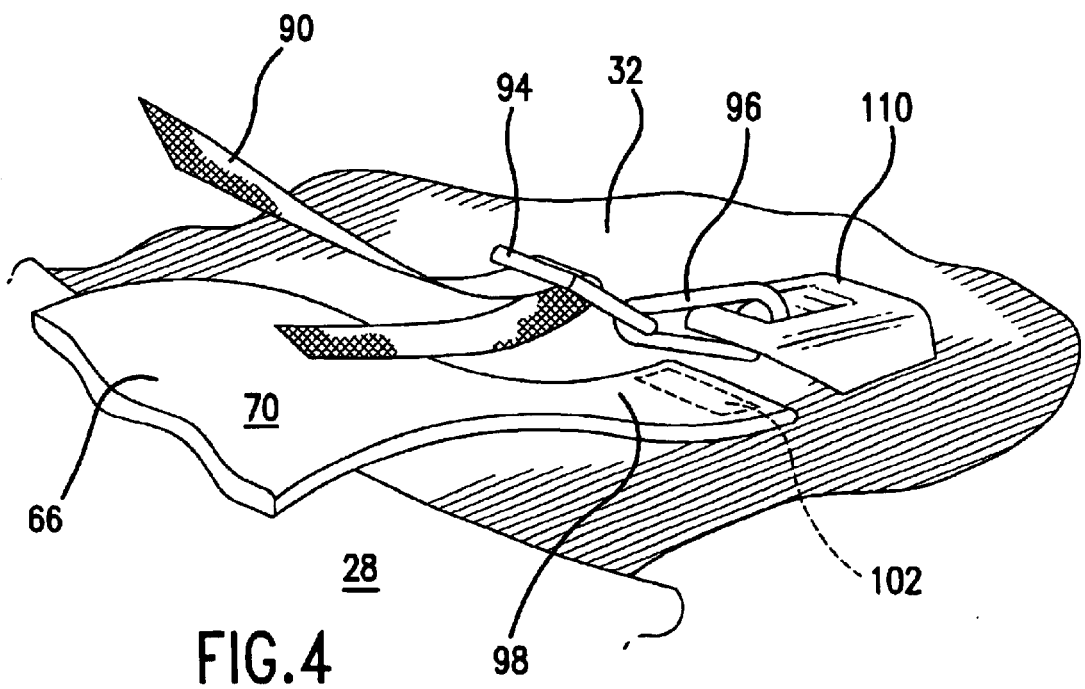
FIG. 4 is an enlarged three-dimensional view of a portion of FIG. 3, depicting attachment to the top tether anchorage point of a LATCH anchorage point system.
Figure 5:
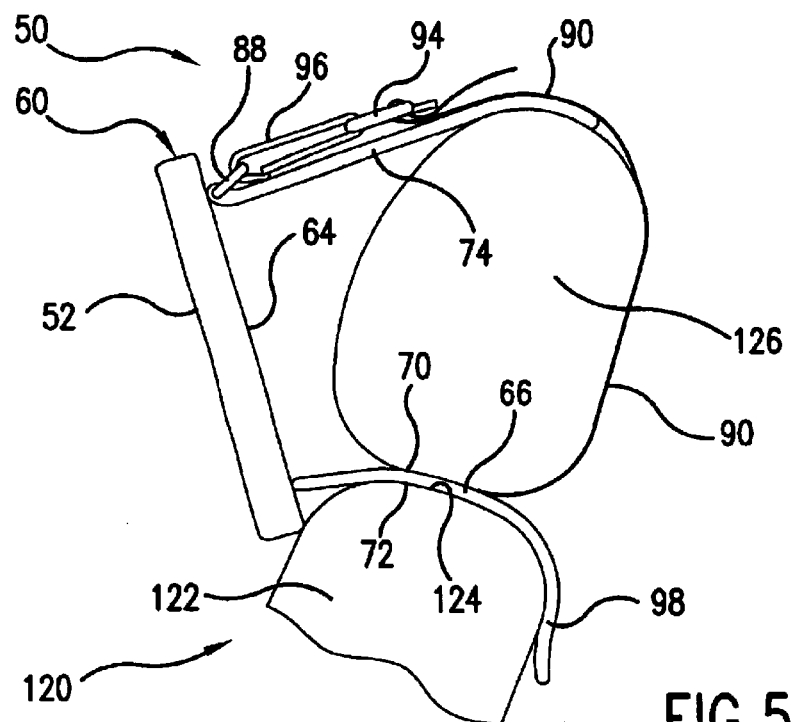
FIG. 5 is a side elevational view depicting the mirror device of FIG. 2 employed in a second attachment configuration, referred to herein as a "Headrest Attachment" configuration.
Figure 6:
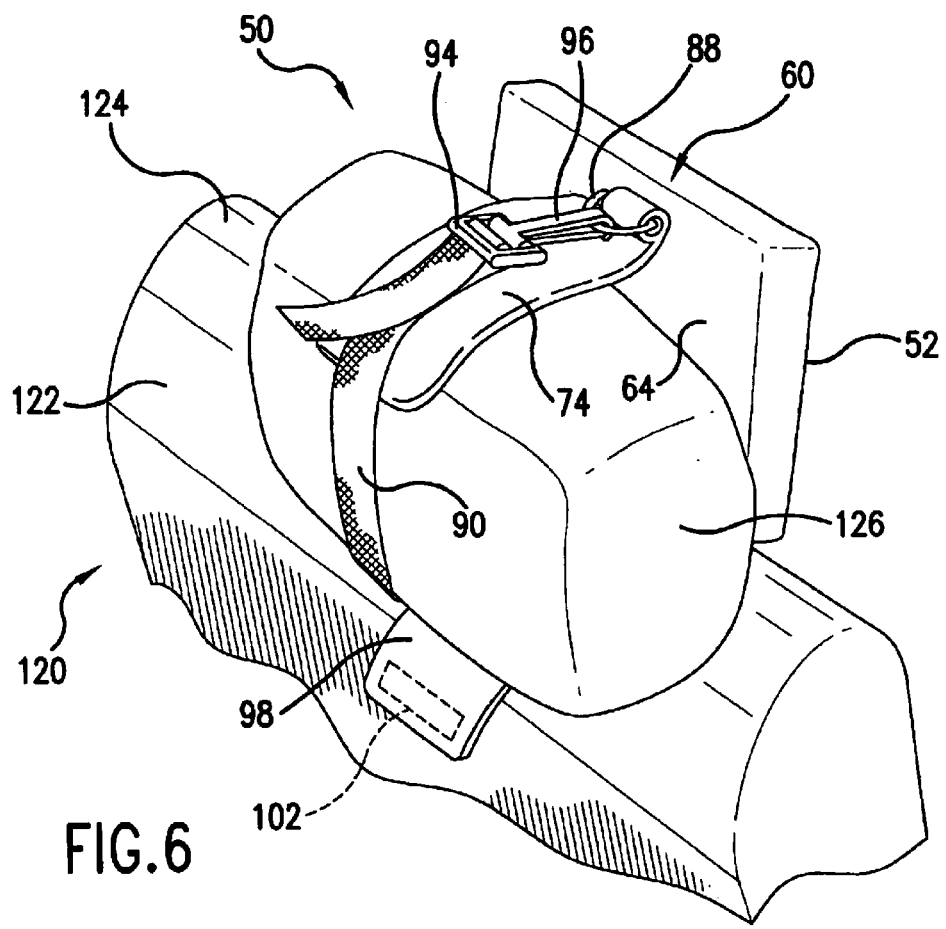
FIG. 6 is a three-dimensional view, generally from the rear, of the mirror device employed in the "Headrest Attachment" configuration of FIG. 5.
Figure 7:
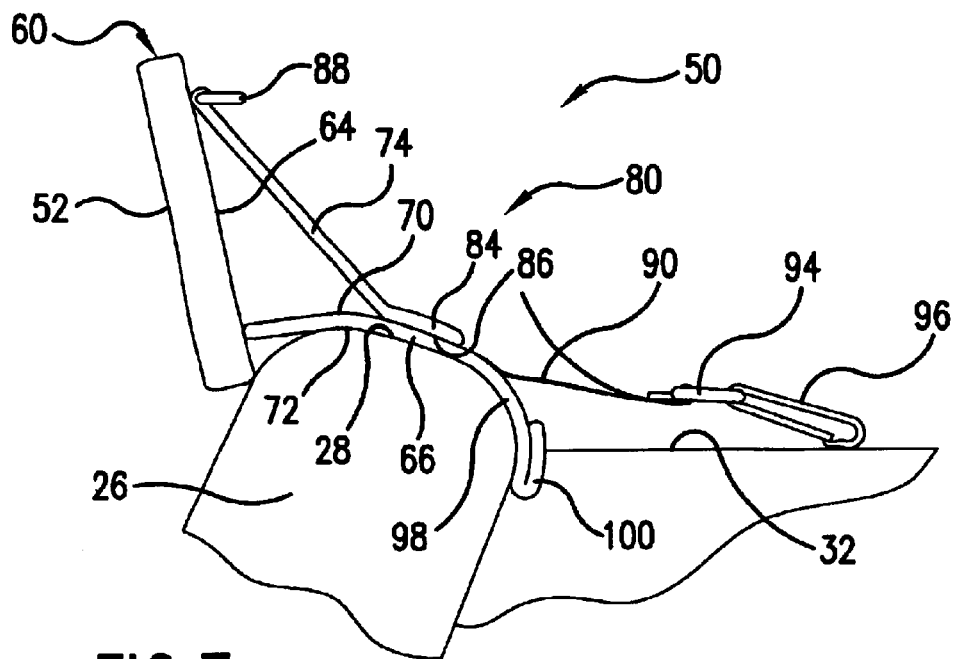
FIG. 7 is a side elevational view of the mirror device of FIG. 2 employed in a third attachment configuration, referred to herein as a "Tuck Attachment" configuration.
Figure 8:
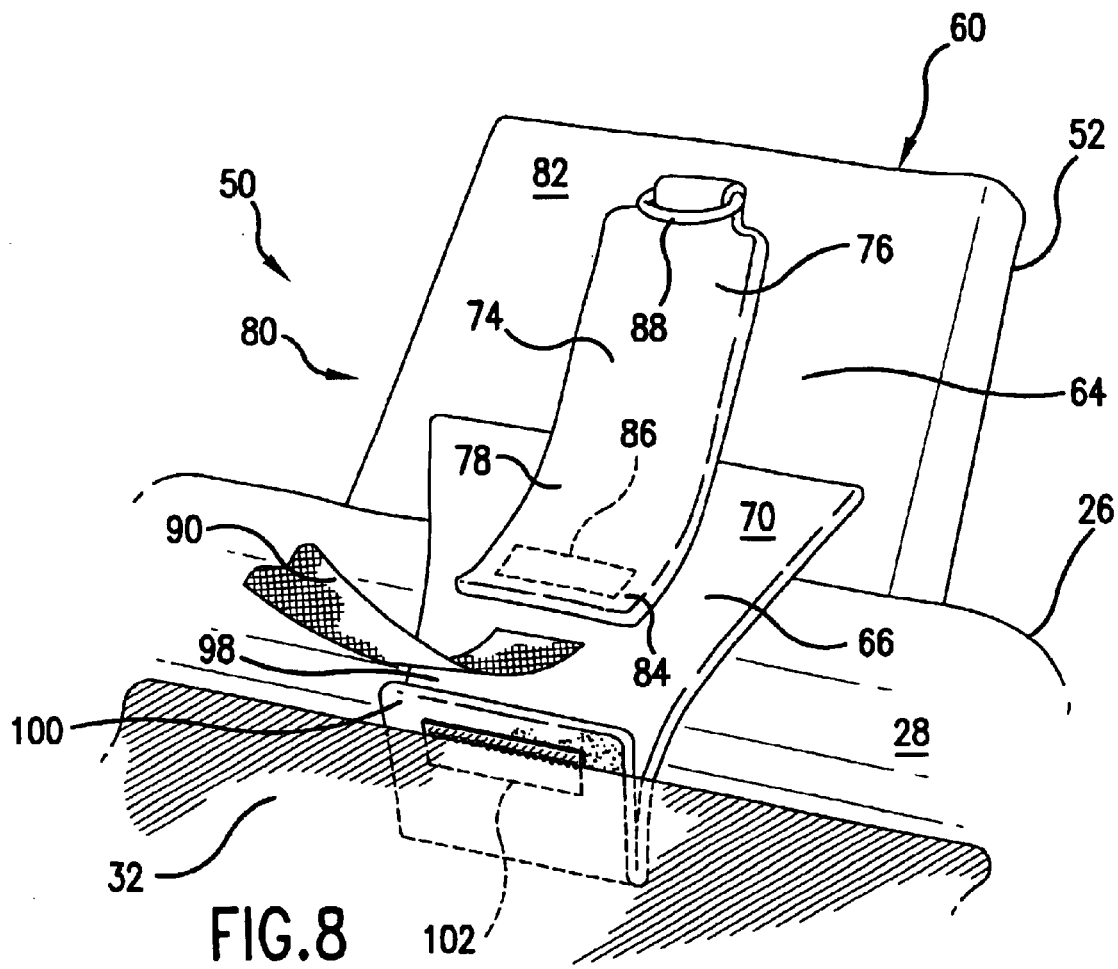
FIG. 8 is a three-dimensional view, generally from the rear, of the mirror device employed in the "Tuck Attachment" configuration of FIG. 7.

A feature of the viewing panel device 50 is that it embodies a plurality of attachment methods or configurations and can be used in vehicles of various possible vehicle configurations. Thus described hereinbelow with reference to FIGS. 3 and 4 is the manner in which the device 50 is attached in the "Tether Attachment" configuration advantageously employing the upper tether anchorage point of a LATCH anchorage point system. Described hereinbelow with reference to FIGS. 5 and 6 is the manner in which the device 50 is installed in the "Headrest Attachment" configuration. Described hereinbelow with reference to FIGS. 7 and 8 is the manner in which the device 50 is installed in the "Tuck Attachment" configuration. Described hereinbelow with reference to FIGS. 9 and 10 is the manner in which the device 50 is installed in the "Fastener Attachment" configuration.

Referring now particularly to FIG. 2, the viewing panel device 50 includes a relatively rigid mirror and backing assembly 60. The mirror and backing assembly 60 includes the reflective front surface 52, that is, the mirror 52, and a fabric rear surface 64, surrounding a core of polyurethane foam (not shown). The mirror and backing assembly 60 thus is representative of a viewing panel 60, which may or may not include a mirror. The mirror and backing assembly 60 or viewing panel 60 is generally vertical during use, although not exactly so, since the mirror 52 is positioned at an appropriate angle for viewing the infant along the optical axis 54 as is diagrammed in FIG. 1. A bottom panel 66 is attached to the mirror and backing assembly 60 generally on the rear surface 64 on a relatively lower portion 68 thereof. The bottom panel 66 has a top surface 70 and a bottom surface 72. Preferably, the bottom surface 72 comprises an anti-skid fabric, such as a rubberized fabric, stitched or otherwise attached to the remainder of the bottom panel 66. During use, the anti-skid bottom surface 72 contacts the seat back top surface 28.

The viewing panel device 50 additionally includes a diagonal support element 74 that can extend between the viewing panel rear surface 64 at an upper end 76 of the support element 74 and the top surface 70 of the bottom panel 66 at a lower end 78 of the support element 74. The support element 74 is employed in the "Tether Attachment" configuration of FIGS. 3 and 4, in the "Tuck Attachment" configuration of FIGS. 7 and 8 and in the "Fastener Attachment" configuration of FIGS. 9 and 10, each described hereinbelow. The support element 74 is removably attachable to one of the viewing panel 60 rear surface 64 and the bottom panel 66 top surface 70. The bottom panel 66 and the diagonal support element 74 together comprise a support structure 86 attached to the mirror and backing assembly 60 or viewing panel 60.

In the illustrated embodiment, the diagonal support element 74 more particularly has its upper end 76 hingedly attached to the rear surface 64 on a relatively upper portion 82 thereof, and is accordingly permanently attached on the upper portion 82 of the rear surface 64 of the mirror and backing assembly 60. The support element 74 extends diagonally during use between the upper portion 82 and the top surface 70 of the bottom panel 66. The support element 74 at its lower end 78 has a flap 84. Secured to the underside of the flap 84 is a strip 86 of an element of a hook-and-loop fastener system (e.g. Velcro®), in particular the "hook" element 86. The top surface 70 of the bottom panel 66 is of a fabric pile material and serves as the "loop" element of the hook-and-loop fastener system at substantially any point along the top surface 70. The support element 74 generally comprises fabric surrounding a core of a soft plastic material such as plastic regrind, and is sufficiently stiff to provide structural integrity.

Also attached or connected to a relatively upper portion of the mirror and backing assembly 60 or viewing panel 60 is an element 88 of a fastener 88 in the form of a D-ring 88. The D-ring 88 is employed during use of the mirror device 50 or viewing panel device 50 in the "Headrest Attachment" configuration of FIGS. 5 and 6, described hereinbelow.

Attached to and extending rearwardly from the bottom panel 66 of the support structure 86 is a tether strap 90. At its free or distal end 92 the tether strap 90 terminates in a length-adjustment buckle 94 and an element 96 of a fastener in the form of a J-Hook 96. The tether strap 90 and J-Hook 96 are employed during use of the mirror device 50 or viewing panel device 50 in the "Tether Attachment" configuration of FIGS. 3 and 4 and in the "Headrest Attachment" configuration of FIGS. 5 and 6, each described hereinbelow.

The bottom panel 66 also has an extending tail 98. At the distal end 100 of the extending tail, on the underside thereof, is a strip 102 of an element 102 of a hook-and-loop fastener system (e.g. Velcro®), such as the "hook" element 102. The extending tail 98 is employed during use of the mirror device 50 or viewing panel device 50 in the "Tuck Attachment" configuration of FIGS. 7 and 8, described hereinbelow. The extending tail 98 and the "hook" element 102 are employed during use of the mirror device 50 or viewing panel device 50 in the "Fastener Attachment" configuration of FIGS. 9 and 10, described hereinbelow.

FIGS. 3 and 4 more particularly illustrate the mirror device 50 or, more generally, the viewing panel device 50, in the first attachment configuration referred to herein as the "Tether Attachment" configuration. The attachment configuration of FIGS. 3 and 4 employs a top tether anchorage point 110 included in newer automobiles, as mandated by United States federal regulation, in particular, through the National Highway Traffic Administration (NHTSA), as part of the so-called LATCH anchorage point system (Lower Anchors and Tethers for CHildren). The LATCH anchorage points are intended for use in combination with forward-facing child safety car seats. When the LATCH anchorage points are employed, the vehicle seat belt system is not required for the installation of a forward-facing child safety car seat. Such forward-facing child safety car seats can have a tether at their upper end, which cooperates with the top tether anchorage point 110. However, in the case of a rear facing infant car seat, the top tether anchorage point 110 is not generally used in combination with the child safety car seat 34, and accordingly is available for other uses. In the particular vehicle configuration represented in FIGS. 3 and 4, the top tether anchorage point 110 is located on the vehicle rear shelf 32 or rear filler panel 32.

In the "Tether Attachment" configuration of FIGS. 3 and 4, the bottom panel 66 is placed over the top surface 28 of the rear seat 24 of the vehicle 20, and the J-hook 96 is attached to the top tether anchorage point 110. In the "Tether Attachment" configuration of FIGS. 3 and 4, the D-ring 88 is not employed, nor is the extending tail 98. The buckle 94 and the support structure 80, more particularly the support element 74 thereof, are adjusted so that the mirror device 50 is in an appropriate position, and the mirror and backing assembly 60 is at a suitable angle for viewing the infant 38 along the optional axis 54 as is diagrammed in FIG. 1.

FIGS. 5 and 6 more particularly illustrate the mirror device 50 or, more generally, the viewing panel device 50, in the second attachment configuration, referred to herein as the "Headrest Attachment" configuration. In the attachment configuration of FIGS. 5 and 6, the mirror device 50 is employed in combination with a rearwardly-positioned vehicle seat 120 which may or may not be the rearmost seat in the vehicle. The seat 120 includes a seat back 122 having a top surface 124. In addition, the seat 120 has a headrest 126 positioned over the top surface 124. The "Headrest Attachment" configuration may be employed in an older vehicle that is not equipped with the LATCH system. The bottom panel 66 is positioned over the top surface 124 of the seat back 122, between the top surface 124 and the headrest 126. The tether strap 90 is looped behind the headrest 126, and the J-hook 96 is attached to the D-ring 88. The effective length of the tether strap 90 is adjusted by means of the adjustment buckle 94 so that the mirror and backing assembly 12 is at a proper angle for viewing the infant 38 along the optical axis 52 as is diagrammed in FIG. 1. In the "Headrest Attachment" configuration of FIGS. 5 and 6, the support element 74 is not employed, and can either lie on top of the headrest 126 as illustrated, or hang generally adjacent the rear surface 64 of the mirror and backing assembly 60.

FIGS. 7 and 8 more particularly illustrate the mirror device 50 or, more generally, the viewing panel device 50, in the third attachment configuration, referred to herein as the "Tuck Attachment" configuration. The "Tuck Attachment" configuration likewise may be employed in an older vehicle which is not equipped with the LATCH system, and which accordingly does not have a top tether anchorage point on the rear shelf 32. In this configuration, the extending tail 98 of the bottom panel 66 is folded and tucked in between the vehicle seat back 26 and the rear shelf 32, and held by friction, aided by the anti skid fabric on the bottom surface 72 of the bottom panel 66. The support structure 80, more particularly the support element 74 thereof, is adjusted, in combination with the particular point at which the fabric of the extending tail 98 is tucked in between the vehicle seat back 26 and rear shelf 32, so that the mirror and backing assembly 60 is positioned at an appropriate angle for viewing the infant 38 along the optical axis 54 as is diagrammed in FIG. 1. In the "Tuck Attachment" configuration of FIGS. 7 and 8, the D-ring 88 and the tether strap 90 with its J-hook are not employed.

Finally, FIGS. 9 and 10 more particularly illustrate the mirror device 50 or, more generally, the viewing panel device 50, in the fourth attachment configuration, referred to herein as the "Fastener Attachment" configuration. In the attachment configuration of FIGS. 9 and 10, the mirror device 50 is employed in combination with a rearwardly-positioned vehicle seat 130 which may or may not be the rearmost seat in the vehicle. The seat 130 includes a seat back 132 having a top surface 124, as well as an accessible rear surface 136. The "Fastener Attachment" configuration likewise may be employed in an older vehicle that is not equipped with the LATCH system.

In the "Fastener Attachment" configuration of FIGS. 9 and 10, the extending tail 98 is employed, as well as the strip 102 of the "hook" element 102 of a hook-and-loop fastener system. A strip 138 of adhesively-backed "loop" material is attached to the seat back rear surface 136 in an appropriate position, and thus serves as a mating element 138 of a fastener. The fastener elements 102 and 138 together secure the extending tail 98 and thus the bottom panel 66 comprising part of the support structure 82 to the seat back 132. In the "Fastener Attachment" configuration of FIGS. 9 and 10, the D-ring 88 and tether strap 90 are not employed. The support structure 80, more particularly the support element 74 thereof, is adjusted, so that the mirror and backing assembly 60 is positioned at an appropriate angle for viewing the infant 38 along the optical axis 54 as is diagrammed in FIG. 1.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A viewing panel device for use in a vehicle including a relatively rearwardly-positioned vehicle seat with a seat back having a top surface, comprising:
   a viewing panel having a front viewing surface and a rear surface; and
   a support structure attached to said rear surface of said viewing panel, said support structure including
      a bottom panel having a top surface and a bottom surface that can contact the seat back top surface, and
      a diagonal support element that extends between said rear surface of said viewing panel at an upper end of said support element and said top surface of said bottom panel at a lower end of said support element.

2. The device of claim 1, wherein said front surface of said viewing panel comprises a mirror positionable for viewing an infant in a rear-facing child safety seat on the vehicle seat.

3. The device of claim 1, wherein said diagonal support element is adjustable.

4. The device of claim 1, which can be used in vehicles having a rear shelf behind the seat back, wherein said bottom panel has an extending tail which can be tucked in between the vehicle seat back and the rear shelf for frictional engagement.

5. The device of claim 1, which can be used in vehicles having a relatively rearwardly-positioned vehicle seat with a seat back having a top surface and a rear surface, wherein said bottom panel has an extending tail which has an element of a fastener on the underside thereof for removably fastening to the vehicle seat rear surface.

6. The device of claim 1, which further comprises:
   an element of a fastener attached to a relatively upper portion of said viewing panel; and
   a tether strap extending from said bottom panel and terminating in a fastener that can be attached either to the top tether anchorage point in a vehicle having a top tether anchorage point intended for attachment of the top tether of a forward-facing child safety seat, or to said fastener element when said tether strap is looped around the headrest in a vehicle having a headrest positioned over the vehicle seat back;
   whereby said device has a plurality of attachment configurations for use in different possible vehicle configurations.

7. The device of claim 6, which is for use in further possible vehicle configurations including in vehicles in which the vehicle seat back has an accessible rear surface, and in vehicles wherein the vehicle seat is a rear seat and which have a rear shelf behind the seat back, wherein:
   said bottom panel has an extending tail;
   said extending tail has an element of a fastener on the underside thereof for removably fastening to the vehicle seat rear surface in vehicles in which the vehicle seat rear surface is accessible; and
   said extending tail can be tucked in between the vehicle seat back and the rear shelf for frictional engagement in vehicles configured with a rear shelf behind the seat back.

8. A viewing panel device having a plurality of attachment configurations for use in vehicles including a relatively rearwardly-positioned vehicle seat with a seat back having a top surface, and of a plurality of possible vehicle configurations including in vehicles having a top tether anchorage point intended for attachment of the top tether of a forward-facing child safety seat, and in vehicles having a headrest positioned over the vehicle seat back, said device comprising:
   a viewing panel having a front viewing surface and a rear surface;
   a bottom panel attached to a relatively lower portion of said viewing panel rear surface, said bottom panel having a top surface and a bottom surface that can contact the seat back top surface;
   an element of a fastener attached to a relatively upper portion of said viewing panel;
   a diagonal support element that can extend between said rear surface of said viewing panel at an upper end of said support element and said top surface of said bottom panel at a lower end of said support element; and
   a tether strap extending from said bottom panel and terminating in a fastener that can be attached either to the top tether anchorage point in a vehicle so configured or to said fastener element when said tether strap is looped around the headrest in a vehicle so configured.

9. The device of claim 8, wherein said front surface of said viewing panel comprises a mirror positionable for viewing an infant in a rear-facing child safety seat on the vehicle seat.

10. The device of claim 8, wherein said diagonal support element is adjustable.

11. The device of claim 8, which is for use in further possible vehicle configurations including in vehicles in which the vehicle seat back has an accessible rear surface, and in vehicles wherein the vehicle seat is a rear seat and which have a rear shelf behind the seat back, wherein:
   said bottom panel has an extending tail;
   said extending tail has an element of a fastener on the underside thereof for removably fastening to the vehicle seat rear surface in vehicles in which the vehicle seat rear surface is accessible; and
   said extending tail can be tucked in between the vehicle seat back and the rear shelf for frictional engagement in vehicles configured with a rear shelf behind the seat back.

12. A viewing panel device for use in a vehicle including a rear vehicle seat with a seat back having a top surface, and a rear shelf behind the seat back, said device comprising:
   a viewing panel having a front viewing surface and a rear surface; and
   a support structure attached to said rear surface of said viewing panel, said support structure including a portion that contacts the seat back top surface, and said support structure having an extending tail;
   whereby said extending tail can be tucked in between the vehicle seat back and the rear shelf for frictional engagement.

13. The device of claim 12, wherein said front surface of said viewing panel comprises a mirror positionable for viewing an infant in a rear-facing child safety seat on the vehicle seat.

14. The device of claim 12, wherein said support structure is adjustable.

15. The device of claim 12, wherein said support structure comprises:
- a bottom panel having a top surface and a bottom surface that contacts the seat back top surface; and
- a diagonal support element that extends between said rear surface of said viewing panel at an upper end of said support element and said top surface of said bottom panel at a lower end of said support element.

16. The device of claim 15, wherein said diagonal support element is adjustable.

17. A viewing panel device for use in a vehicle including a relatively rearwardly-positioned vehicle seat with a seat back having a top surface and a rear surface, said device comprising:
- a viewing panel having a front viewing surface and a rear surface; and
- a support structure attached to said rear surface of said viewing panel, said support structure including a portion that contacts the seat back top surface, and said support structure having an extending tail;
- said extending tail having an element of a fastener on the underside thereof for removably fastening to the vehicle seat rear surface.

18. The device of claim 17, wherein said front surface of said viewing panel comprises a mirror positionable for viewing an infant in a rear-facing child safety seat on the vehicle safety seat.

19. The device of claim 17 which further comprises a mating element of a fastener that is secured to the vehicle seat rear surface and positioned for engaging said fastener element on said extending tail.

20. The device of claim 17, wherein said support structure is adjustable.

21. The device of claim 17, wherein said support structure comprises:
- a bottom panel having a top surface and a bottom surface that contacts the seat back top surface; and
- a diagonal support element that extends between said rear surface of said viewing panel at an upper end of said support element and said top surface bottom panel at a lower end of said support element.

22. The device of claim 21, wherein said diagonal support element is adjustable.

* * * * *